(12) United States Patent
Di Pietro et al.

(10) Patent No.: US 11,641,363 B2
(45) Date of Patent: May 2, 2023

(54) METHODS AND SYSTEMS FOR VERIFYING THE AUTHENTICITY OF A REMOTE SERVICE

(71) Applicant: Qatar Foundation for Education, Science and Community Development, Doha (QA)

(72) Inventors: Roberto Di Pietro, Doha (QA); Savio Sciancalepore, Doha (QA); Simone Raponi, Doha (QA)

(73) Assignee: Qatar Foundation for Education, Science and Community Development, Doha (QA)

( * ) Notice: Subject to any disclaimer, the term of this patent is extended or adjusted under 35 U.S.C. 154(b) by 270 days.

(21) Appl. No.: 16/657,088

(22) Filed: Oct. 18, 2019

(65) Prior Publication Data

US 2020/0228541 A1 Jul. 16, 2020

Related U.S. Application Data

(60) Provisional application No. 62/792,011, filed on Jan. 14, 2019.

(51) Int. Cl.
*H04L 9/40* (2022.01)
*H04L 9/30* (2006.01)
*H04L 9/32* (2006.01)

(52) U.S. Cl.
CPC .......... *H04L 63/123* (2013.01); *H04L 9/3073* (2013.01); *H04L 9/3215* (2013.01);
(Continued)

(58) Field of Classification Search
None
See application file for complete search history.

(56) References Cited

U.S. PATENT DOCUMENTS 6,243,816 B1 * 6/2001 Fang ............... G06F 21/41
707/999.009
6,892,307 B1 * 5/2005 Wood ............... H04L 9/3263
726/8
(Continued)

FOREIGN PATENT DOCUMENTS

CN 104657860 A 5/2015
CN 107592308 A 1/2018
(Continued)

OTHER PUBLICATIONS

Reimair et al "Emulating U2F authenticator devices," The 2nd IEEE Workshop on Security and Privacy in the Cloud, pp. 1-9 (Year: 2016).*

(Continued)

*Primary Examiner* — Luu T Pham
*Assistant Examiner* — James J Wilcox
(74) *Attorney, Agent, or Firm* — Cooper Legal Group, LLC

(57) ABSTRACT

Disclosed herein are methods and systems that can be used by an end-user to verify both the identity of a remote service (4) and the authenticity of a response provided by the remote service (4), even if the first authentication arrangement (2) used to interact with the remote service (4) is compromised. The end-user requests the remote service (4) to provide evidence of its identity, in the form of potentially different authentication materials. The authentication materials are then verified independently on each additional authentication arrangements (6, 7) and used to determine the authenticity of the response from the remote service (4).

18 Claims, 4 Drawing Sheets

(52) U.S. Cl.
CPC .......... *H04L 9/3234* (2013.01); *H04L 9/3247*
(2013.01); *H04L 9/3263* (2013.01)

(56) References Cited

U.S. PATENT DOCUMENTS

| | | | | |
|---|---|---|---|---|
| RE38,899 E * | 11/2005 | Fischer | ................ | H04L 9/3263 380/258 |
| 7,194,759 B1 * | 3/2007 | Chess | ................ | H04L 9/3263 709/203 |
| 7,353,385 B2 * | 4/2008 | Nakano | ................ | H04L 9/3234 713/168 |
| 8,639,939 B2 * | 1/2014 | Holtzman | ............. | H04L 9/3228 713/173 |
| 8,800,017 B2 * | 8/2014 | Ghosh | ................ | H04L 9/3234 726/9 |
| 8,819,437 B2 * | 8/2014 | Wittenberg | .......... | H04L 9/3213 713/172 |
| 9,231,933 B1 * | 1/2016 | Shenoy | ................ | H04L 63/08 |
| 9,264,419 B1 * | 2/2016 | Johansson | ............... | G06F 21/45 |
| 9,385,863 B2 * | 7/2016 | Beyer | ............... | H04M 3/382 |
| 9,407,437 B1 * | 8/2016 | Campagna | ............... | H04L 9/16 |
| 9,544,147 B2 * | 1/2017 | Rouskov | ............... | H04L 63/105 |
| 9,641,339 B2 * | 5/2017 | Ho | ............... | H04L 63/126 |
| 9,698,992 B2 * | 7/2017 | Gertner | ............... | H04L 63/123 |
| 9,806,887 B1 * | 10/2017 | Campagna | ............... | H04L 9/0822 |
| 10,171,477 B1 * | 1/2019 | Karnik | ............... | H04L 63/123 |
| 10,284,379 B1 * | 5/2019 | Muftic | ............... | H04L 9/3247 |
| 10,284,567 B2 * | 5/2019 | Todasco | ............... | H04L 63/0853 |
| 10,305,901 B2 | 5/2019 | Evans | | |
| 10,325,079 B1 * | 6/2019 | Vukich | ............... | H04L 9/3239 |
| 10,521,861 B1 * | 12/2019 | Ju | ............... | G06Q 20/389 |
| 10,547,613 B1 * | 1/2020 | Roths | ............... | H04L 9/0844 |
| 10,911,319 B2 * | 2/2021 | Perkal | ............... | G06F 21/44 |
| 10,972,349 B1 * | 4/2021 | Branton | ............... | H04L 63/126 |
| 10,979,403 B1 * | 4/2021 | Mutescu | ............... | H04L 9/0631 |
| 11,012,495 B1 * | 5/2021 | Vakalapudi | ............... | H04L 9/3263 |
| 11,210,379 B1 * | 12/2021 | Lindley | ............... | H04L 9/3231 |
| 11,314,893 B2 * | 4/2022 | Vladimerou | ........ | H04L 63/0428 |
| 11,341,267 B1 * | 5/2022 | Haverlah | ............... | H04L 9/0637 |
| 2002/0010684 A1 * | 1/2002 | Moskowitz | ............... | H04L 9/30 713/176 |
| 2006/0242423 A1 * | 10/2006 | Kussmaul | ............. | H04L 9/3247 713/182 |
| 2006/0291664 A1 * | 12/2006 | Suarez | ................ | H04L 9/3263 380/286 |
| 2007/0118745 A1 * | 5/2007 | Buer | ................ | G06F 21/34 713/168 |
| 2007/0118875 A1 * | 5/2007 | Chow | ................ | H04L 63/0846 726/2 |
| 2008/0086764 A1 * | 4/2008 | Kulkarni | ............. | H04L 9/3215 726/7 |
| 2008/0086767 A1 * | 4/2008 | Kulkarni | ............. | H04L 9/3234 726/9 |
| 2008/0086770 A1 * | 4/2008 | Kulkarni | ............. | H04L 63/0876 726/20 |
| 2008/0098464 A1 * | 4/2008 | Mizrah | ................ | G06F 21/36 726/5 |
| 2008/0123862 A1 * | 5/2008 | Rowley | ................ | H04L 9/3271 380/279 |
| 2008/0130879 A1 * | 6/2008 | Heinonen | ............. | H04L 9/3247 380/44 |
| 2008/0170697 A1 * | 7/2008 | Heinonen | ............. | H04L 63/0823 380/277 |
| 2008/0261560 A1 * | 10/2008 | Ruckart | ............. | H04L 9/3234 455/411 |
| 2009/0019292 A1 * | 1/2009 | Fransson | ............. | G06F 3/0386 713/193 |
| 2009/0041253 A1 * | 2/2009 | Chen | ................ | H04L 9/3247 380/282 |
| 2009/0172328 A1 * | 7/2009 | Sahita | ................ | G06F 12/1491 711/163 |
| 2009/0240947 A1 * | 9/2009 | Goyal | ................ | H04L 9/3247 713/176 |
| 2009/0282245 A1 * | 11/2009 | Farrugia | ................ | G06F 21/10 713/168 |
| 2009/0327737 A1 * | 12/2009 | Hsu | ................ | H04L 9/3247 713/181 |
| 2010/0037293 A1 * | 2/2010 | StJohns | ................ | H04L 9/3263 726/2 |
| 2010/0107228 A1 * | 4/2010 | Lin | ................ | H04L 63/18 726/5 |
| 2011/0026716 A1 * | 2/2011 | Tang | ................ | H04W 12/0471 380/46 |
| 2011/0197070 A1 | 8/2011 | Mizrah | | |
| 2012/0036364 A1 * | 2/2012 | Yoneda | ................ | H04L 9/006 713/175 |
| 2012/0079570 A1 * | 3/2012 | Fu | ................ | H04L 9/3234 726/5 |
| 2013/0031008 A1 * | 1/2013 | Wilson | ................ | H04L 9/3247 705/76 |
| 2013/0262858 A1 * | 10/2013 | Neuman | ................ | H04L 9/30 713/155 |
| 2013/0283035 A1 * | 10/2013 | Tomlinson | ............ | H04L 63/123 713/150 |
| 2013/0312073 A1 * | 11/2013 | Srivastav | ............ | H04L 9/3215 726/7 |
| 2013/0333008 A1 * | 12/2013 | Tapling | ................ | H04L 9/3271 726/7 |
| 2014/0108789 A1 * | 4/2014 | Phatak | ................ | H04L 63/0823 713/168 |
| 2014/0289834 A1 * | 9/2014 | Lindemann | .......... | G06Q 20/425 726/7 |
| 2014/0294175 A1 * | 10/2014 | Boloker | ................ | G06T 1/005 380/30 |
| 2014/0325220 A1 * | 10/2014 | Tunnell | ................ | H04L 9/3215 713/168 |
| 2015/0058965 A1 * | 2/2015 | Yefimov | ................ | H04L 63/0807 726/9 |
| 2015/0106893 A1 * | 4/2015 | Hou | ................ | H04L 9/0891 726/6 |
| 2015/0112680 A1 * | 4/2015 | Lu | ................ | G10L 15/142 704/244 |
| 2015/0172054 A1 * | 6/2015 | Prakash | ................ | H04L 9/3263 713/189 |
| 2015/0172286 A1 * | 6/2015 | Tomlinson | ............ | H04L 9/321 726/7 |
| 2015/0281952 A1 * | 10/2015 | Patil | ................ | H04W 12/50 713/168 |
| 2015/0312041 A1 * | 10/2015 | Choi | ................ | H04L 63/0861 713/175 |
| 2016/0191513 A1 * | 6/2016 | Tomlinson | ............ | H04L 9/321 713/168 |
| 2016/0226872 A1 * | 8/2016 | Oberheide | .......... | H04L 63/0876 |
| 2016/0275491 A1 | 9/2016 | Kaladgi et al. | | |
| 2016/0294563 A1 * | 10/2016 | Qian | ................ | H04L 63/0428 |
| 2016/0373252 A1 * | 12/2016 | Goldstein | ........... | H04L 63/0442 |
| 2017/0011405 A1 | 1/2017 | Pandey | | |
| 2017/0070353 A1 * | 3/2017 | Suwirya | ................ | H04L 9/006 |
| 2017/0078270 A1 * | 3/2017 | Tang | ................ | H04L 63/083 |
| 2017/0093585 A1 * | 3/2017 | Lee | ................ | H04L 9/14 |
| 2017/0171219 A1 * | 6/2017 | Campagna | ............ | H04L 9/0841 |
| 2017/0177852 A1 * | 6/2017 | Krawczyk | ............ | G06F 21/36 |
| 2017/0195123 A1 * | 7/2017 | Oberheide | ................ | H04L 9/14 |
| 2017/0223014 A1 * | 8/2017 | Roth | ................ | H04W 12/06 |
| 2017/0374055 A1 * | 12/2017 | Smith | ................ | H04L 63/12 |
| 2018/0025148 A1 * | 1/2018 | Jain | ................ | H04L 9/3215 713/166 |
| 2018/0034800 A1 * | 2/2018 | Pistauer | ................ | H04L 9/321 |
| 2018/0124049 A1 * | 5/2018 | Lu | ................ | H04L 63/0853 |
| 2018/0176217 A1 * | 6/2018 | Spencer | ................ | H04L 63/107 |
| 2018/0218753 A1 * | 8/2018 | Hodge | ............ | G08B 13/19684 |
| 2018/0219851 A1 * | 8/2018 | Woo | ................ | H04L 63/083 |
| 2019/0036695 A1 * | 1/2019 | Ries | ................ | H04L 9/14 |
| 2019/0132131 A1 * | 5/2019 | Clements | ............. | H04L 9/3239 |
| 2019/0156000 A1 * | 5/2019 | Hoffmann | ............. | H04L 9/3234 |
| 2019/0207927 A1 * | 7/2019 | Lakhani | ................ | G06F 21/42 |
| 2019/0272361 A1 * | 9/2019 | Kursun | ................ | H04L 67/535 |
| 2019/0349204 A1 * | 11/2019 | Enke | ................ | G06F 21/602 |
| 2019/0356661 A1 * | 11/2019 | Hecht | ................ | H04L 9/0891 |
| 2019/0364032 A1 * | 11/2019 | Stöhr | ................ | H04L 9/3226 |

(56) References Cited

U.S. PATENT DOCUMENTS

| | | | | |
|---|---|---|---|---|
| 2020/0044851 | A1* | 2/2020 | Everson | G06Q 20/401 |
| 2020/0134617 | A1* | 4/2020 | Barnett | G06Q 20/28 |
| 2020/0136816 | A1* | 4/2020 | Prasad Nittur | H04L 9/088 |
| 2020/0195434 | A1* | 6/2020 | Bereza Júnior | G06F 21/60 |
| 2020/0228541 | A1* | 7/2020 | Di Pietro | H04L 63/123 |
| 2021/0036975 | A1* | 2/2021 | Shtendel | H04L 51/04 |
| 2021/0042107 | A1* | 2/2021 | Ilincic | G06F 8/71 |
| 2021/0044972 | A1* | 2/2021 | Murray | G06F 21/602 |
| 2021/0073359 | A1* | 3/2021 | Boodaei | H04L 9/0844 |
| 2021/0200853 | A1* | 7/2021 | Lagnado | G06F 21/35 |
| 2021/0377219 | A1* | 12/2021 | Finchelstein | H04L 63/205 |
| 2021/0377726 | A1* | 12/2021 | Finney | H04L 67/10 |
| 2021/0397716 | A1* | 12/2021 | Kovah | H04L 63/0823 |
| 2022/0231834 | A1* | 7/2022 | Das | H04L 9/3236 |
| 2022/0231865 | A1* | 7/2022 | Bedi | H04L 9/3234 |
| 2022/0247579 | A1* | 8/2022 | Bester | H04W 12/06 |
| 2022/0255931 | A1* | 8/2022 | Avetisov | H04L 9/3263 |

FOREIGN PATENT DOCUMENTS

| | | | | |
|---|---|---|---|---|
| CN | 104660605 B | 3/2018 | | |
| EP | 1792437 B1 * | 10/2017 | | H04L 63/18 |
| WO | 2010088757 A1 | 8/2010 | | |
| WO | 2018065820 A1 | 4/2018 | | |

OTHER PUBLICATIONS

Gilbert et al "YouProve: Authenticity and Fidelity in Mobile Sensing," SenSys'11, Nov. 1-4, 2011, pp. 176-189 (Year: 2011).*

Ayu Tiwari, et al, "A Multi-Factor Security Protocol for Wireless Payment—Secure Web Authentication Using Mobile Devices", arXiv:1111.3010, 2011.

Ziyi Han, et al., "A Novel Multifactor Two-Server Authentication Scheme under the Mobile Cloud Computing", International Conference on Networking and Network Applications, 2017, pp. 341-346.

Federico Sinigaglia, et al., "A Survey on Multi-Factor Authentication for Online Banking in the Wild", Journal of Computers & Security, Nov. 6, 2019.

Sirapat Boonkrong, "Internet Banking Login with Multi-Factor Authentication", KSII Transactions on Internet and Information Systems, Jan. 2017, vol. 11, No. 1, pp. 511-535.

Abhilasha Bhargav-Spantzel, et al., "Privacy Preserving Multi-Factor Authentication with Biometrics", Journal of Computer Security, Jul. 23, 2007, vol. 15, No. 5, pp. 529-560.

Xinyi Huang, et al., "Robust Multi-Factor Authentication for Fragile Communications", Transactions on Dependable and Secure Computing, Nov./Dec. 2014, vol. 11, No. 6., pp. 568-581.

Alain Hiltgen, et al., "Secure Internet Banking Authentication", IEEE Security & Privacy, Apr. 18, 2006, vol. 4, Issue 2, pp. 21-29.

Sabout Nagaraju, et al., "Trusted framework for online banking in public cloud using multi-factor authentication and privacy protection gateway", Journal of Cloud Computing: Advances, Systems and Applications, Dec. 1, 2015, vol. 4, No. 22, pp. 1-23.

Alireza Pirayesh Sabzevar, et al., "Universal Multi-Factor Authentication Using Graphical Passwords", IEEE International Conference on Signal Image Technology and Internet Based Systems, Dec. 22, 2008, p. 625-632, doi: 10.1109/SITIS.2008.92.

Babins Shrestha, et al., "ZEMFA: Zero-Effort Multi-Factor Authentication based on Multi-Modal Gait Biometrics", 17th International Conference on Privacy, Security and Trust (PST), Fredericton, NB, Canada, 2019, pp. 1-10, doi: 10.1109/PST47121.2019.8949032.

* cited by examiner

METHODS AND SYSTEMS FOR VERIFYING THE AUTHENTICITY OF A REMOTE SERVICE

CROSS-REFERENCE TO RELATED APPLICATIONS

The present application is a non-provisional filing of and claims priority to U.S. Provisional Patent Application 62/792,011, titled "Methods and solutions to guarantee information and transactions authenticity" and filed on Jan. 14, 2019, which is incorporated herein by reference.

FIELD

The present invention relates to methods and systems for verifying the authenticity of a remote service. The present invention more particularly relates to methods and systems for verifying the identity of a remote service and the authenticity of data provided by the remote service.

BACKGROUND

Multi-factor authentication techniques are often used to strengthen the security of legacy authentication techniques based on weak credentials, such as usernames and passwords. Multi-factor authentication is often used at the server side to validate, by multiple means, the identity of a remote device claiming to be acting on behalf of an end-user.

However, often the connection between the authentication service and the end-user is compromised, e.g., via software, malware, or a physical device that re-routes the end-user request to different service providers. The software needed to verify the identity of the authentication server usually relies on the verification of its identity through classical Public Key Infrastructure (PKI)-based methods, leveraging the verification of the digital certificate of the authentication service or the possession of the private key corresponding to the public key of the authentication service. However, these methods are ineffective if the primary authentication terminal (e.g., the laptop or the smartphone of the end-user) are compromised by hardware or software malwares.

BRIEF DESCRIPTION OF THE DRAWINGS

So that the present invention may be more readily understood, embodiments of the present invention will now be described, by way of example, with reference to the accompanying drawings, in which.

SUMMARY

Figure 1:
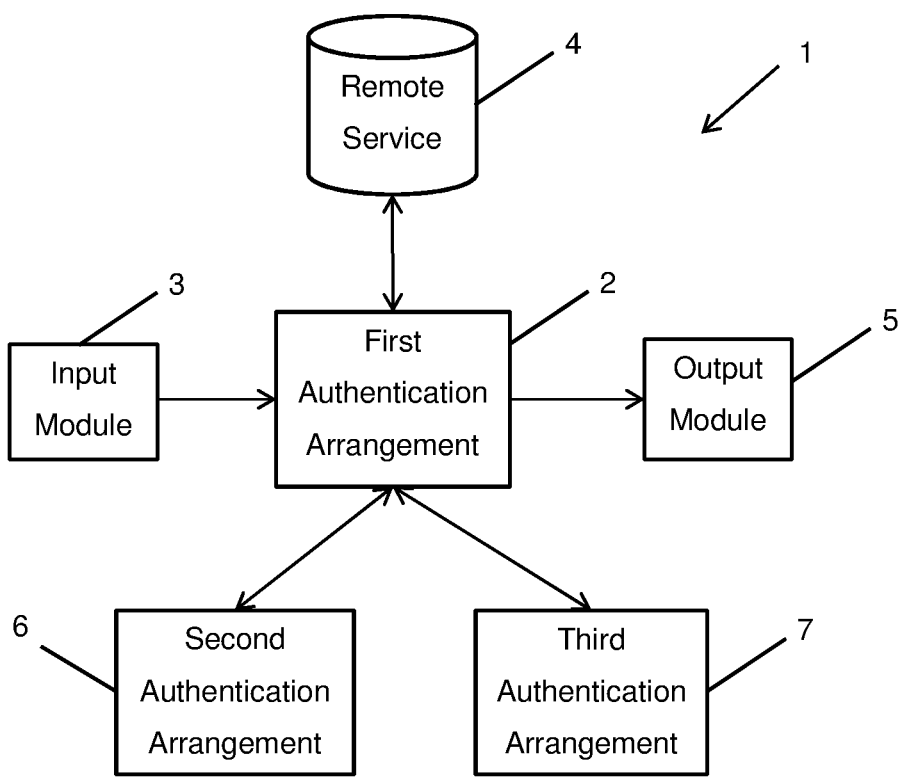
FIG. 1 is a schematic diagram of a system of some embodiments.

According to one aspect of the present invention, there is provided a computer-implemented method for verifying authenticity of a remote service, the method comprising: sending a request from a first authentication arrangement to the remote service; receiving, at the first authentication arrangement, a response from the remote service which comprises authentication data; sending the authentication data from the first authentication arrangement to a second authentication arrangement; verifying authenticity of the authentication data at the second authentication arrangement; outputting a first authenticity indicator from the second authentication arrangement to the first authentication arrangement, the first authenticity indicator indicating whether or not the second authentication arrangement determines that the authentication data is authentic; sending the authentication data from the first authentication arrangement to a third authentication arrangement; verifying authenticity of the authentication data at the third authentication arrangement; outputting a second authenticity indicator from the third authentication arrangement to the first authentication arrangement, the second authenticity indicator indicating whether or not the third authentication arrangement determines that the authentication data is authentic; and determining authenticity of the response from the remote service based on at least one of the first authenticity indicator or the second authenticity indicator.

In some embodiments, the method further comprises generating the authentication data at the remote service using a private key of a private/public key pair.

In some embodiments, the second authentication arrangement and third authentication arrangement each verify the authenticity of the authentication data using a public key of the private/public key pair which is obtained from one of local storage or remote storage via a communication path, wherein the communication path is a different communication path from a communication path used by the first authentication arrangement to communicate with the remote service.

In some embodiments, the method further comprises: outputting a visual message indicative of at least one of the first authenticity indicator or the second authenticity indicator by displaying the visual message on a screen.

In some embodiments, the method further comprises: outputting a video clip indicative of at least one of the first authenticity indicator or the second authenticity indicator by displaying the video clip on a screen.

In some embodiments, the method further comprises: outputting an audio clip indicative of at least one of the first authenticity indicator or the second authenticity indicator by outputting the audio clip via a loudspeaker.

In some embodiments, the method further comprises: outputting an authenticity notification indicative of at least one of the first authenticity indicator or the second authenticity indicator to a decision module; and determining, at the decision module, the authenticity of the response from the remote service based on the authenticity notification.

In some embodiments, the method further comprises: sending the authentication data from the first authentication arrangement to at least one further authentication arrangement; verifying authenticity of the authentication data at the at least one further authentication arrangement; and outputting a further authenticity indicator from each further authentication arrangement of the at least one further authentication arrangement to the first authentication arrangement, the further authenticity indicator indicating whether or not the further authentication arrangement determines that the authentication data provided by the remote service is authentic.

According to another aspect of the present invention, there is provided a system for verifying authenticity of a remote service, the system comprising: a first authentication arrangement configured to send a request to the remote service and receive a response from the remote service which comprises authentication data; a second authentication arrangement configured to receive the authentication data from the first authentication arrangement, verify authenticity of the authentication data, and output a first authenticity indicator to the first authentication arrangement, the first authenticity indicator indicating whether or not the second authentication arrangement determines that the authentication data is authentic; a third authentication arrangement configured to receive the authentication data from the first authentication arrangement, verify authenticity of the authentication data, and output a second authenticity indicator to the first authentication arrangement, the second authenticity indicator indicating whether or not the third authentication arrangement determines that the authentication data is authentic; and a decision module configured to determine authenticity of the response from the remote service based on at least one of the first authenticity indicator or the second authenticity indicator.

In some embodiments, the system further comprises: a remote service encryption module configured to generate the authentication data at the remote service using a private key of a private/public key pair.

In some embodiments, the second authentication arrangement and third authentication arrangement each comprise an encryption module configured to verify the authenticity of the authentication data using a public key of the private/public key pair which is obtained from one of local storage or remote storage via a communication path, wherein the communication path is a different communication path from a communication path used by the first authentication arrangement to communicate with the remote service.

In some embodiments, the system further comprises: a screen configured to display a visual message indicative of at least one of the first authenticity indicator or the second authenticity indicator.

In some embodiments, the system further comprises: a screen configured to display a video clip indicative of at least one of the first authenticity indicator or the second authenticity indicator.

In some embodiments, the system further comprises: a loudspeaker configured to output an audio clip indicative of at least one of the first authenticity indicator or the second authenticity indicator.

In some embodiments, the decision module configured to receive an authenticity notification indicative of at least one of the first authenticity indicator or the second authenticity indicator and to determine the authenticity of the response from the remote service based on the authenticity notification.

In some embodiments, the system further comprises: at least one further authentication arrangement configured to receive the authentication data from the first authentication arrangement, verify authenticity of the authentication data, and output a further authenticity indicator to the first authentication arrangement, the further authenticity indicator indicating whether or not the at least one further authentication arrangement determines that the authentication data provided by the remote service is authentic.

According to a further aspect of the present invention, there is provided a non-transitory computer readable medium storing instructions which, when executed by one or more processors, cause the one or more processors to: send a request from a first authentication arrangement to a remote service; receive, at the first authentication arrangement, a response from the remote service which comprises authentication data; send the authentication data from the first authentication arrangement to a second authentication arrangement; verify authenticity of the authentication data at the second authentication arrangement; output a first authenticity indicator from the second authentication arrangement to the first authentication arrangement, the first authenticity indicator indicating whether or not the second authentication arrangement determines that the authentication data is authentic; send the authentication data from the first authentication arrangement to a third authentication arrangement; verify authenticity of the authentication data at the third authentication arrangement; output a second authenticity indicator from the third authentication arrangement to the first authentication arrangement, the second authenticity indicator indicating whether or not the third authentication arrangement determines that the authentication data is authentic; and determine authenticity of the response from the remote service based on at least one of the first authenticity indicator or the second authenticity indicator.

According to another aspect of the present invention, there is provided a computer-implemented method for verifying authenticity of a remote service, the method comprising: sending a request from a first authentication arrangement to the remote service; receiving, at the first authentication arrangement, a response from the remote service which comprises authentication data; sending the authentication data from the first authentication arrangement to a second authentication arrangement; receiving, at the first authentication arrangement, a first authenticity indicator from the second authentication arrangement, the first authenticity indicator indicating whether or not the second authentication arrangement determines that the authentication data is authentic; sending the authentication data from the first authentication arrangement to a third authentication arrangement; receiving, at the first authentication arrangement, a second authenticity indicator from the third authentication arrangement, the second authenticity indicator indicating whether or not the third authentication arrangement determines that the authentication data is authentic; and determining authenticity of the response from the remote service based on at least one of the first authenticity indicator or the second authenticity indicator.

According to a further aspect of the present invention, there is provided a non-transitory computer readable medium storing instructions which, when executed by one or more processors, cause the one or more processors to: send a request from a first authentication arrangement to the remote service; receive, at the first authentication arrangement, a response from the remote service which comprises authentication data; send the authentication data from the first authentication arrangement to a second authentication arrangement; receive, at the first authentication arrangement, a first authenticity indicator from a second authentication arrangement, the first authenticity indicator indicating whether or not the second authentication arrangement determines that the authentication data is authentic; send the authentication data from the first authentication arrangement to a third authentication arrangement; receive, at the first authentication arrangement, a second authenticity indicator from the third authentication arrangement, the second authenticity indicator indicating whether or not the third authentication arrangement determines that the authentication data is authentic; and determine the authenticity of the response from the remote service based on at least one of the first authenticity indicator or the second authenticity indicator.

DETAILED DESCRIPTION

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

The following disclosure provides many different embodiments, or examples, for implementing different features of the provided subject matter. Specific examples of components, concentrations, applications and arrangements are described below to simplify the present disclosure. These are, of course, merely examples and are not intended to be limiting. For example, the attachment of a first feature and a second feature in the description that follows may include embodiments in which the first feature and the second feature are attached in direct contact, and may also include embodiments in which additional features may be positioned between the first feature and the second feature, such that the first feature and the second feature may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1 of the accompanying drawings, a system 1 of some embodiments comprises a first authentication arrangement 2. In some embodiments, the first authentication arrangement 2 is implemented in a computing device or system, such as a desktop computer, laptop computer, a tablet or a smartphone. In further embodiments, the first authentication arrangement 2 is implemented as a computer program module running on a computing device or system.

The system 1 further comprises an input module 3 which is configured to receive an input from a user or from a computing device or a computing system. The input module 3 is coupled for communication with the first authentication arrangement 2 and configured to communicate an input request from the input module 3 to the first authentication arrangement 2.

The first authentication arrangement 2 is coupled for communication with a remote service 4. In some embodiments, the remote service 4 is a computing device or system, such as a server, which is coupled for communication with the first authentication arrangement 2 via a computer network. In some embodiments, the computer network is the Internet and the connection is a wired and/or wireless connection.

The first authentication arrangement 2 is coupled for communication with an output module 5 which is configured to provide an output to a user or to another computing device or system.

The first authentication arrangement 2 is further coupled for communication with a second authentication arrangement 6 and a third authentication arrangement 7. Each of the second and third authentication arrangements 6, 7 are configured to verify the authenticity or authentication data provided by the first authentication arrangement 2. The second and third authentication arrangements 6, 7 are configured to output respective authenticity indicators to the first authentication arrangement 2 which indicate whether or not the respective second and/or third authentication arrangements determine that the authentication data is authentic.

The operation of the system 1 and a method for verifying the authenticity of the remote service 4 will now be described with reference to FIG. 2 of the accompanying drawings.

The method allows a user to verify the authenticity of the remote service 4 accessed via the first authentication arrangement 2 by using the second and third authentication arrangements 6, 7 which each provide a response which is indicative of the authenticity of the remote service 4. In this embodiment, there are two additional authentication arrangements 6, 7 but further embodiments comprise at least one further authentication arrangement.

Figure 2:
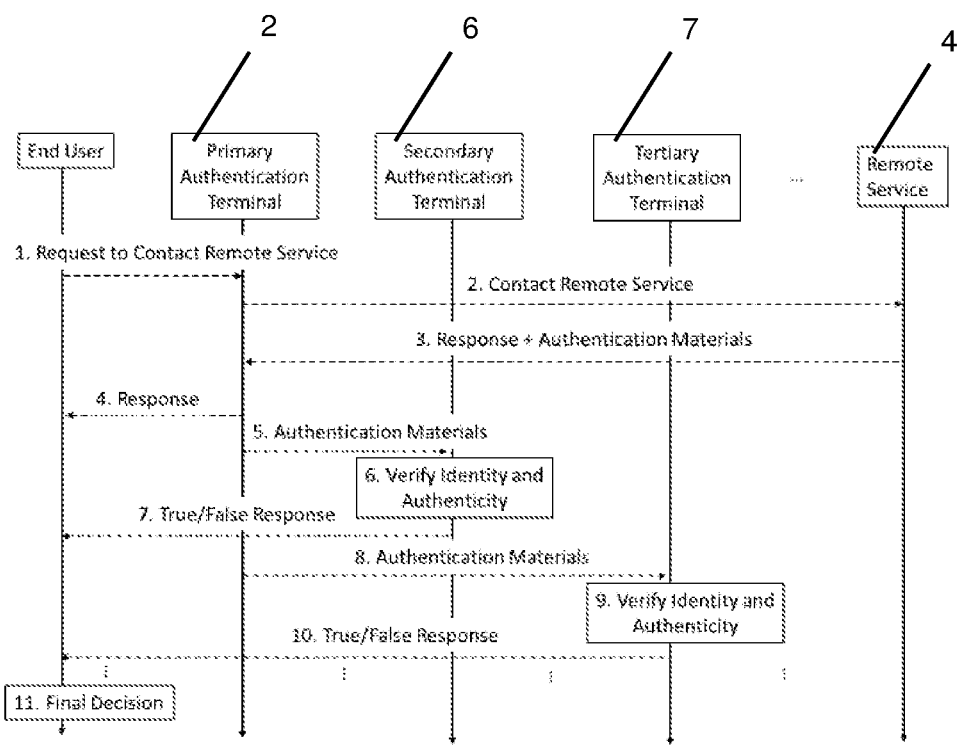
FIG. 2 is a sequence diagram showing an example of the operation of the method of some embodiments.

In the example shown in FIG. 2, a user using the first authentication arrangement 2 wishes to authenticate information delivered by the remote service 4 by means of a Multi-Factor Authentication (MFA) technique. In some embodiments, the remote service 4 is equipped with a private key and a public key of a public/private key pair which are used for performing authentication operations. In these embodiments, the public key of the private/public key pair is stored on each of the authentication arrangements 2, 6, 7.

In use, a user provides an input via the input module 3 which instructs the first authentication arrangement 2 to send a request to the remote service 4. In this embodiment, the first authentication arrangement 2 sends the request to the remote service 4 via a computer network which comprises wired and/or wireless connections.

The remote service 4 responds to the request by sending a response to the first authentication arrangement 2 which comprises authentication data. In some embodiments, the response comprises response data which is provided together with the authentication data. The response data may be any kind of information or data. In some embodiments, the remote service 4 provides the authentication data in the form of data which is encrypted using the private key of a private/public key pair stored by the remote service 4.

When the first authentication arrangement 2 receives the response from the remote service 4, the first authentication arrangement 2 attempts to decrypt the response using the public key of the private/public key pair which is stored at the first authentication arrangement 2. Successful decryption of the data by the first authentication arrangement 2 using the public key validates the identity of the remote service 4. If the first authentication arrangement 2 is not able to decrypt the data provided by the remote service 4 using the public key then the system concludes that the identity of the remote service 4 is not valid and hence that the response provided by the remote service 4 cannot be trusted.

To provide further evidence of the identity of the remote service 4, the first authentication arrangement 2 sends the authentication data to the second authentication arrangement 6 and to the third authentication arrangement 7. Each of these additional authentication arrangements 6, 7 verifies (independently or in collaboration) the authenticity of the authentication data sent by the remote service 4. In some embodiments, this verification is carried out by the additional authentication arrangements 6, 7 by assessing whether the additional authentication arrangements 6, 7 are able to decrypt the authentication data using a public key stored at each of the additional authentication arrangements 6, 7.

Each of the additional authentication arrangements 6, 7 outputs an authenticity indicator to the first authentication arrangement 2 which is indicative of whether or not the additional authentication arrangement 6, 7 determines that the authentication data is authentic.

In some embodiments, the system provides the authenticity indicators to a user via the output module 5 so that the user can use the authenticity indicators to determine whether or not the response provided by the remote service 4 is authentic. For instance, the user can decide on the authenticity of the response provided by the remote service 4 based on the number of authenticity indicators which indicate that the response is authentic, based on a majority voting, absolute majority criteria or other principle. In further embodiments, the first authentication arrangement 2 or another computing device or system is configured to determine the authenticity of the response provided by the remote service 4 based on the authenticity indicators.

The additional authentication arrangements 6, 7 seek to enhance the security of the system by enabling a response from the remote service 4 to be authenticated even when the first authentication arrangement 2 (e.g. the user's device) is compromised. The method and system is therefore useful for detecting man-in-the-middle attacks which target the communication link between the first authentication arrangement 2 and the remote service 4.

Different use-cases for the proposed techniques and systems are discussed below.

Multi-Factor Authentication of a Message

In this use-case, as shown in FIG. 2, the remote service delivers an authentication message that is then delivered to all the other authentication terminals for further verification.

The actions are summarized below:
1. The user instructs the First Authentication Arrangement 2 to contact the Remote Service 4, to retrieve general information.
2. The First Authentication Arrangement 2 contacts the Remote Service 4.
3. The Remote Service 4 provides a Response, along with Authentication Data that allow the verification of the content of the response.
4. The First Authentication Arrangement 2 outputs the response to the user.
5. The First Authentication Arrangement 2 delivers the received (authenticated) authentication material to the Second Authentication Arrangement 6, for further independent validation.
6. The Second Authentication Arrangement 6 evaluates the authenticity of the received material based on the knowledge of the genuine parameters of the Remote Service 4.
7. The Second Authentication Arrangement 6 provides a True/False response to the user.
8. The First Authentication Arrangement 2 delivers the received (authenticated) authentication material to the Third Authentication Arrangement 7, for further independent validation.
9. The Third Authentication Arrangement 7 evaluates the authenticity of the received material based on the knowledge of the genuine parameters of the Remote Service 4.
10. The Third Authentication Arrangement 7 provides a True/False response to the user.
   The process described in acts 5-6-7 or 8-9-10 is repeated for every Additional Authentication Arrangement as desired by the user.
11. Based on the feedbacks received by the independent additional authentication arrangement, the user makes a final decision on the authenticity of the provided response.

Multi-Factor Authentication of Multiple Messages

Figure 3:
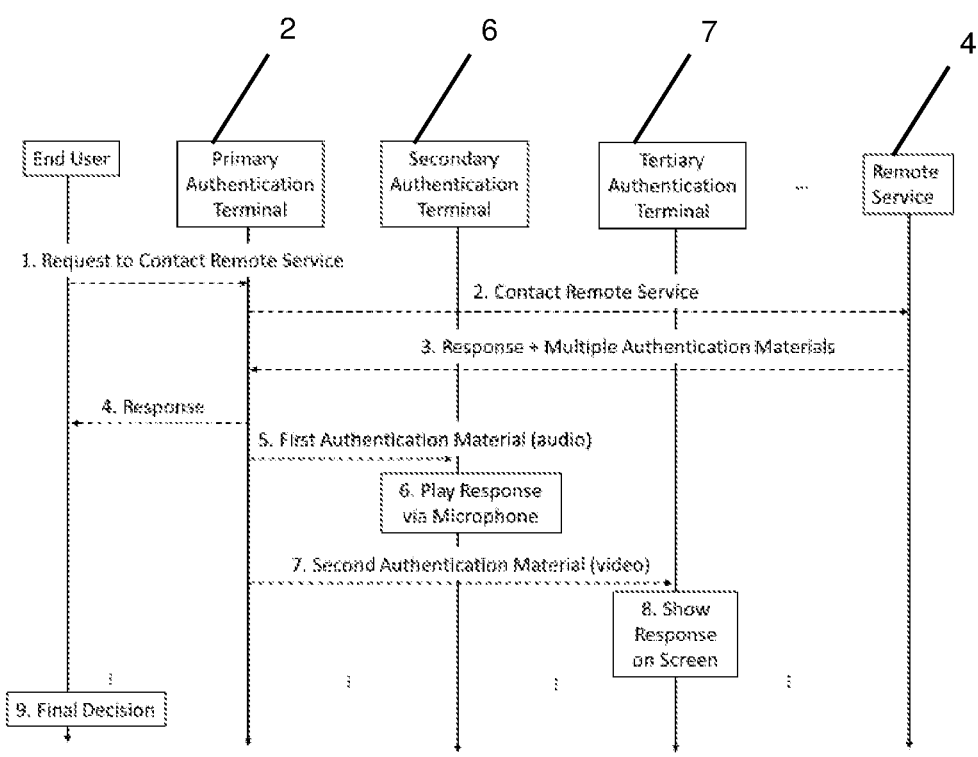
FIG. 3 is a sequence diagram showing another example of the operation of the method of some embodiments.

This use case will now be described with reference to FIG. 3 of the accompanying drawings. In this use case, the user requests the delivery of multiple (different) authentication arrangements 6, 7 from the remote service 4, tailored to the capabilities of the additional authentication arrangements 6, 7.

The actions are summarized below:
1. The user instructs the First Authentication Arrangement 2 to contact the Remote Service 4, to retrieve information.
2. The First Authentication Arrangement 2 contacts the Remote Service 4.
3. The Remote Service 4 provides a Response, along with multiple Authentication Data that allow the verification of the content of the response though different means (e.g. audio and/or video, to name a few).
4. The First Authentication Arrangement 2 shows the response to the user.
5. The First Authentication Arrangement 2 delivers one of the received (authenticated) authentication material to the Second Authentication Arrangement 6, for further independent validation.
6. The Second Authentication Arrangement 6 evaluates the authenticity of the received material based on the knowledge of the genuine parameters of the Remote Service 4 and provides a response to the user in the form of a sound, reproducing the details of the transaction through acoustic signals (e.g., via a loudspeaker in the output module 5).
7. The First Authentication Arrangement 2 delivers other received (authenticated) authentication material to the Third Authentication Arrangement 7, for further independent validation.
8. The Third Authentication Arrangement 7 evaluates the authenticity of the received material based on the knowledge of the genuine parameters of the Remote Service 4 and provides a response to the user in the form of an image, containing the details of the transaction, e.g. via its screen.
   The process described in acts 5-6 or 7-8 is repeated for every Additional Authentication Arrangement as desired by the user.
9. Based on the feedback received by the independent additional authentication terminals (i.e., the audio sound and the image), the user takes a final decision on the authenticity of the provided response.

Multi-Factor Authentication of a Monetary Transaction

Figure 4:
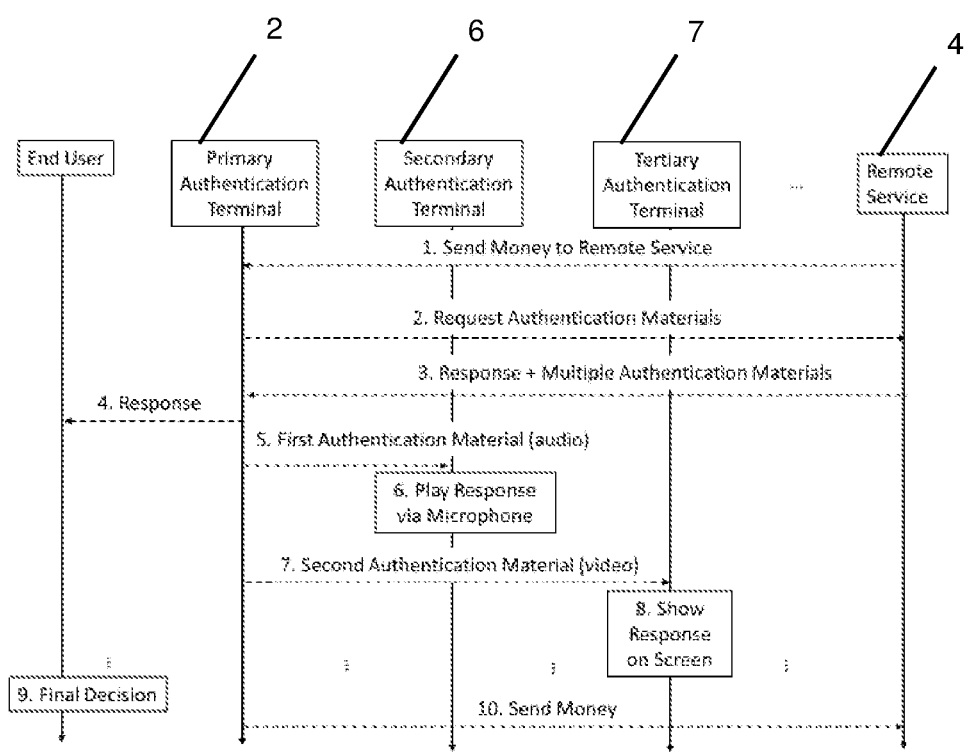
FIG. 4 is a sequence diagram showing another example of the operation of the method of some embodiments.

This use case will now be described with reference to FIG. 4 of the accompanying drawings. The actions are summarized below:
1. The Remote Service 4 requests a payment from the First Authentication Arrangement 2, attaching the details of the payment.
2. The user instructs the First Authentication Arrangement 2 to contact the Remote Service 4, to retrieve authenticated information about the imminent transaction.
3. The Remote Service 4 provides a Response, along with multiple Authentication Data that allow the verification of the content of the response though different means (audio and video, to name a few).
4. The First Authentication Arrangement 2 outputs the response to the user.
5. The First Authentication Arrangement 2 delivers one of the received (authenticated) authentication data to the Second Authentication Arrangement 6, for further independent validation.
6. The Second Authentication Arrangement 6 evaluates the authenticity of the received material based on the knowledge of the genuine parameters of the Remote Service 4 and provides a response to the user in the form of a sound, reproducing the details of the transaction through acoustic signals, e.g. via its loudspeaker.
7. The First Authentication Arrangement 2 delivers other received (authenticated) authentication data to the Third Authentication Arrangement 7, for further independent validation.

8. The Third Authentication Arrangement 7 evaluates the authenticity of the received material based on the knowledge of the genuine parameters of the Remote Service 4 and provides a response to the user in the form of an image, containing the details of the transaction, e.g. by using its screen.

The process described in acts 5-6 or 7-8 is repeated for every Additional Authentication Arrangement as desired by the end-user.

9. Based on the feedback received by the independent additional authentication arrangements (i.e., the audio sound and the image), the user makes a final decision on the authenticity of the provided response.

10. If the responses match, the user can send the requested payment securely to the remote service.

The system and method of some embodiments has the potential to be of crucial importance for military and financial applications, requiring strong mutual authentication features not only from the remote service toward the user, but also on the user's side, toward the remote service. In a military scenario, the proposed system can be used to verify, without any doubt, the authenticity of sensitive information provided by remote services that are supposed to be trusted when issuing commands and orders. Similarly, in a financial setting, it is of crucial importance to verify undoubtedly the authenticity of a remote service claiming to be a bank or an authoritative credit institution, in order to be protected against online frauds.

The existing (mainly software-oriented) products tackling remote-service authentication are focused on a strong multi-factor "user" authentication. This is due to the assumption that the remote service is often trusted, or in any event more trustworthy than the user willing to access its services. For these reasons, mutual authentication schemes involve only a single authentication "shot" for the remote service; instead, applications requiring multi-factor authentication by multiple means focus on the user's authentication, instead of verifying the identity of the remote service, or the authenticity of the information it provides.

The system and method of some embodiments seeks to assess both the identity and the authenticity of the information provided by remote services by using multiple, independent devices, thus gaining an enhanced trust on the remote service.

Unlike most existing systems, the system and method of some embodiments seeks to take into account the possibility that the main remote services used for the communication could be compromised. The system and method of some embodiments seeks to guarantee the detection of any compromising of the remote service, while assuring, at the same time, the authenticity and identity of the remote service.

The foregoing outlines features of several embodiments so that those of ordinary skill in the art may better understand various aspects of the present disclosure. Those of ordinary skill in the art should appreciate that they may readily use the present disclosure as a basis for designing or modifying other processes and structures for carrying out the same purposes and/or achieving the same advantages of various embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application and the appended claims are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used, such terms are intended to be inclusive in a manner similar to the term "comprising". Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others of ordinary skill in the art based upon a reading and understanding of this specification and the annexed drawings. The disclosure comprises all such modifications and alterations and is limited only by the scope of the following claims. In particular regard to the various functions performed by the above described features (e.g., elements, resources, etc.), the terms used to describe such features are intended to correspond, unless otherwise indicated, to any features which performs the specified function of the described features (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

Embodiments of the subject matter and the functional operations described herein can be implemented in digital electronic circuitry, or in computer software, firmware, or hardware, including the structures disclosed in this specification and their structural equivalents, or in combinations of one or more of them.

Some embodiments are implemented using one or more modules of computer program instructions encoded on a computer-readable medium for execution by, or to control the operation of, a data processing apparatus. The computer-readable medium can be a manufactured product, such as hard drive in a computer system or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The terms "computing device" and "data processing apparatus" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks.

To provide for interaction with a user, some embodiments are implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A computer-implemented method for verifying authenticity of a remote service, the method comprising:
   sending a request from a first authentication terminal to the remote service;
   receiving, at the first authentication terminal, a response from the remote service which comprises authentication data generated at the remote service using a private key of a private/public key pair;
   verifying authenticity of the authentication data at the first authentication terminal;
   wherein when the first authentication terminal verifies that the authentication data is authentic:
      sending the authentication data from the first authentication terminal to a second authentication terminal;
      verifying authenticity of the authentication data at the second authentication terminal;
      wherein when the second authentication terminal verifies that the authentication data is authentic:
         outputting a first authenticity indicator from the second authentication terminal to a user, the first authenticity indicator indicating whether or not the second authentication terminal determines that the authentication data is authentic;
      sending the authentication data from the first authentication terminal to at least one further authentication terminal;
      verifying authenticity of the authentication data at the at least one further authentication terminal;
      outputting a further authenticity indicator from each further authentication terminal of the at least one further authentication terminal to the first authentication terminal, the further authenticity indicator indicating whether or not the further authentication terminal determines that the authentication data provided by the remote service is authentic;
      sending the authentication data from the first authentication terminal to a third authentication terminal;
      verifying authenticity of the authentication data at the third authentication terminal;
      wherein when the third authentication terminal verifies that the authentication data is authentic:
         outputting a second authenticity indicator from the third authentication terminal to the user, the second authenticity indicator indicating whether or not the third authentication terminal determines that the authentication data is authentic; and determining authenticity of the response from the remote service based on at least one of the first authenticity indicator or the second authenticity indicator; and wherein when at least one of the first authentication terminal, the second authentication terminal, the third authentication terminal, or the at least one further authentication terminal verifies that the authentication data is not authentic, the method comprises:

providing an indication to the user that the remote service is not authentic and cannot be trusted.

2. The method of claim 1, wherein the second authentication terminal and the third authentication terminal each verify the authenticity of the authentication data using a public key of the private/public key pair which is obtained from one of local storage or remote storage via a communication path, wherein the communication path is a different communication path from a communication path used by the first authentication terminal to communicate with the remote service.

3. The method of claim 1, wherein the method further comprises:

outputting a visual message indicative of at least one of the first authenticity indicator or the second authenticity indicator by displaying the visual message on a screen.

4. The method of claim 1, wherein the method further comprises:

outputting a video clip indicative of at least one of the first authenticity indicator or the second authenticity indicator by displaying the video clip on a screen.

5. The method of claim 1, wherein the method further comprises:

outputting an audio clip indicative of at least one of the first authenticity indicator or the second authenticity indicator by outputting the audio clip via a loudspeaker.

6. The method of claim 1, wherein the method further comprises:

outputting an authenticity notification indicative of at least one of the first authenticity indicator or the second authenticity indicator to a decision module; and determining, at the decision module, the authenticity of the response from the remote service based on the authenticity notification.

7. A system for verifying authenticity of a remote service, the system comprising:

a first authentication terminal comprising a first processor and a first memory, the first memory storing executable instructions which, when executed by the first processor cause the first authentication terminal to send a request to the remote service and receive a response from the remote service which comprises authentication data generated at the remote service using a private key of a private/public key pair, and verify authenticity of the authentication data;

a second authentication terminal comprising a second processor and a second memory, the second memory storing executable instructions which, when executed by the second processor cause the second authentication terminal to receive the authentication data from the first authentication terminal, verify authenticity of the authentication data, and output a first authenticity indicator to a user when the first authentication terminal verifies that the authentication data is authentic, the first authenticity indicator indicating whether or not the second authentication terminal determines that the authentication data is authentic;

a third authentication terminal comprising a third processor and a third memory, the third memory storing executable instructions which, when executed by the third processor cause the third authentication terminal to receive the authentication data from the first authentication terminal when the first authentication terminal verifies that the authentication data is authentic, verify authenticity of the authentication data, and output a second authenticity indicator to the user, the second authenticity indicator indicating whether or not the third authentication terminal determines that the authentication data is authentic;

at least one further authentication terminal configured to receive the authentication data from the first authentication terminal, verify authenticity of the authentication data, and output a further authenticity indicator to the first authentication terminal, the further authenticity indicator indicating whether or not the at least one further authentication terminal determines that the authentication data provided by the remote service is authentic; and a decision device comprising a fourth processor and a fourth memory, the fourth memory storing executable instructions which, when executed by the fourth processor cause the decision device to determine authenticity of the response from the remote service based on at least one of the first authenticity indicator or the second authenticity indicator;

wherein when at least one of the first authentication terminal, the second authentication terminal, the third authentication terminal, or the at least one further authentication terminal verifies that the authentication data is not authentic:

the system provides an indication to the user that the remote service is not authentic and cannot be trusted.

8. The system of claim 7, wherein the second authentication terminal and the third authentication terminal each comprise an encryption device comprising a sixth processor and a sixth memory, the sixth memory storing executable instructions which, when executed by the sixth processor cause the encryption device to verify the authenticity of the authentication data using a public key of the private/public key pair which is obtained from one of local storage or remote storage via a communication path, wherein the communication path is a different communication path from a communication path used by the first authentication terminal to communicate with the remote service.

9. The system of claim 7, wherein the system further comprises:

a screen configured to display a visual message indicative of at least one of the first authenticity indicator or the second authenticity indicator.

10. The system of claim 7, wherein the system further comprises:

a screen configured to display a video clip indicative of at least one of the first authenticity indicator or the second authenticity indicator.

11. The system of claim 7, wherein the system further comprises:

a loudspeaker configured to output an audio clip indicative of at least one of the first authenticity indicator or the second authenticity indicator.

12. The system of claim 7, wherein:

the decision device is configured to receive an authenticity notification indicative of at least one of the first authenticity indicator or the second authenticity indicator and to determine the authenticity of the response from the remote service based on the authenticity notification.

13. A non-transitory computer readable medium storing executable instructions which, when executed by a computing system, cause the computing system to perform a method for verifying authenticity of a remote service, comprising:
  sending a request from a first authentication terminal to the remote service;
  receiving, at the first authentication terminal, a response from the remote service which comprises authentication data generated at the remote service using a private key of a private/public key pair;
  verifying authenticity of the authentication data at the first authentication terminal;
  wherein when the first authentication terminal verifies that the authentication data is authentic:
    sending the authentication data from the first authentication terminal to a second authentication terminal;
    verifying authenticity of the authentication data at the second authentication terminal;
    wherein when the second authentication terminal verifies that the authentication data is authentic:
      outputting a first authenticity indicator from the second authentication terminal to a user, the first authenticity indicator indicating whether or not the second authentication terminal determines that the authentication data is authentic;
      sending the authentication data from the first authentication terminal to at least one further authentication terminal;
      verifying authenticity of the authentication data at the at least one further authentication terminal;
      outputting a further authenticity indicator from each further authentication terminal of the at least one further authentication terminal to the first authentication terminal, the further authenticity indicator indicating whether or not the further authentication terminal determines that the authentication data provided by the remote service is authentic;
      sending the authentication data from the first authentication terminal to a third authentication terminal;
      verifying authenticity of the authentication data at the third authentication terminal;
      wherein when the third authentication terminal verifies that the authentication data is authentic:
        outputting a second authenticity indicator from the third authentication terminal to the user, the second authenticity indicator indicating whether or not the third authentication terminal determines that the authentication data is authentic; and
      determining authenticity of the response from the remote service based on at least one of the first authenticity indicator or the second authenticity indicator; and
  wherein when at least one of the first authentication terminal, the second authentication terminal, the third authentication terminal, or the at least one further authentication terminal verifies that the authentication data is not authentic, the method comprises:
    providing an indication to the user that the remote service is not authentic and cannot be trusted.

14. The non-transitory computer readable medium of claim 13, wherein the second authentication terminal and the third authentication terminal each verify the authenticity of the authentication data using a public key of the private/public key pair which is obtained from one of local storage or remote storage via a communication path, wherein the communication path is a different communication path from a communication path used by the first authentication terminal to communicate with the remote service.

15. The non-transitory computer readable medium of claim 13, wherein the method further comprises:
  outputting a visual message indicative of at least one of the first authenticity indicator or the second authenticity indicator by displaying the visual message on a screen.

16. The non-transitory computer readable medium of claim 13, wherein the method further comprises:
  outputting a video clip indicative of at least one of the first authenticity indicator or the second authenticity indicator by displaying the video clip on a screen.

17. The non-transitory computer readable medium of claim 13, wherein the method further comprises:
  outputting an audio clip indicative of at least one of the first authenticity indicator or the second authenticity indicator by outputting the audio clip via a loudspeaker.

18. The non-transitory computer readable medium of claim 13, wherein the method further comprises:
  outputting an authenticity notification indicative of at least one of the first authenticity indicator or the second authenticity indicator to a decision module; and
  determining, at the decision module, the authenticity of the response from the remote service based on the authenticity notification.

* * * * *